Feb. 2, 1971  W. A. GARDNER  3,559,258
METHOD AND APPARATUS FOR BURNISHING A BORE
Filed Jan. 29, 1969  2 Sheets-Sheet 1
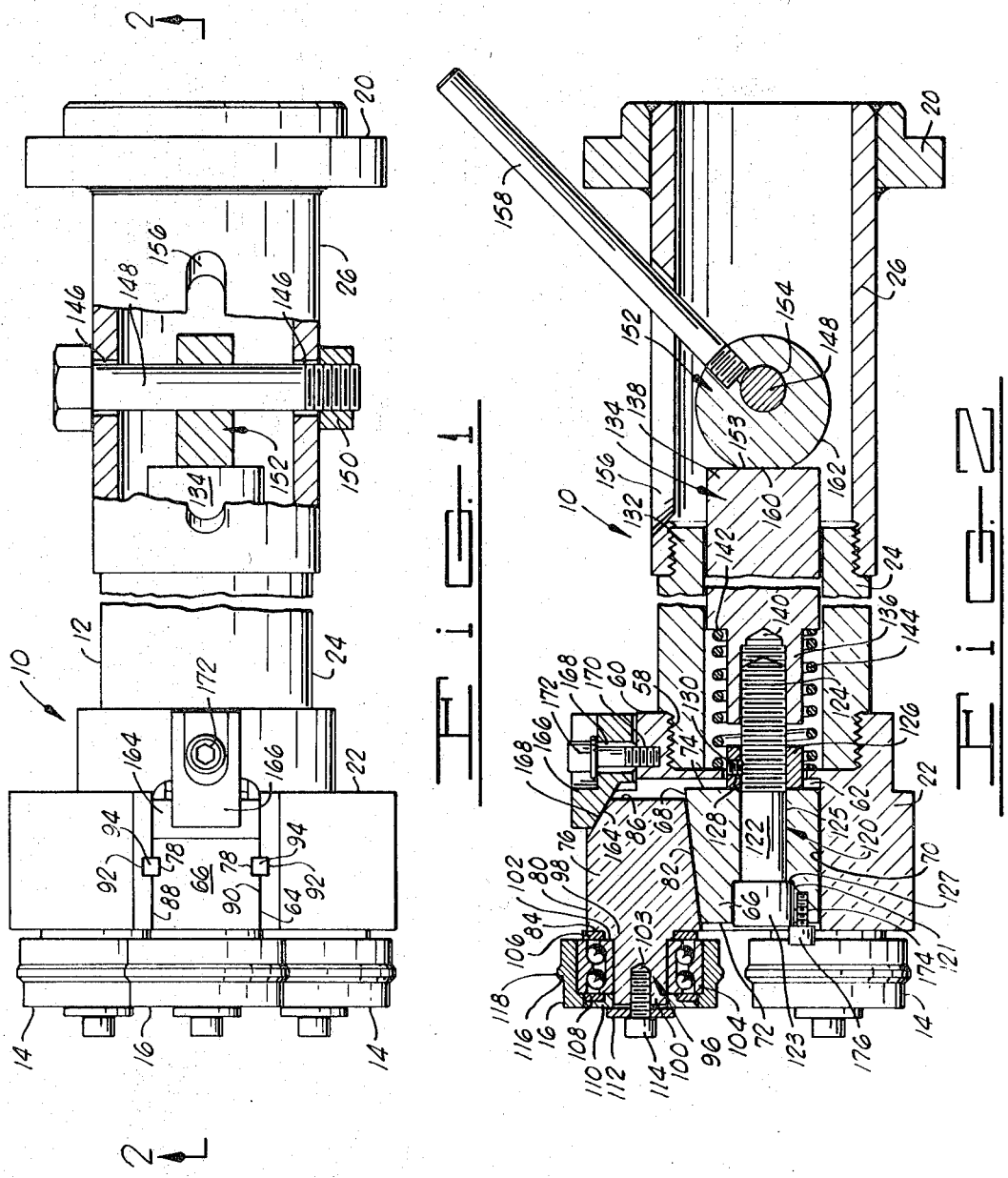
INVENTOR.
WILLIAM A. GARDNER
BY
Dunlap, Laney, Hessin & Dougherty
ATTORNEYS

INVENTOR.
WILLIAM A. GARDNER

United States Patent Office 3,559,258
Patented Feb. 2, 1971

3,559,258
METHOD AND APPARATUS FOR BURNISHING A BORE
William A. Gardner, Duncan, Okla., assignor to Halliburton Company, Duncan, Okla.
Filed Jan. 29, 1969, Ser. No. 795,009
Int. Cl. B24b 39/02
U.S. Cl. 29—90                                11 Claims

ABSTRACT OF THE DISCLOSURE

A tool for burnishing and work hardening a bore comprising an elongated flexible body having narrow rotatable rollers positioned around the periphery thereof. One of said rotatable rollers is adjustable in directions perpendicular to the axis of said body so that it may be locked in a position against the bore causing the body to deflect and the other rollers to contact the bore. The bore to be burnished is rotated while the tool is moved progressively along the bore. When the tool has passed through the bore thereby burnishing the bore, the adjustable roller is retracted allowing the tool to be removed without scratching the burnished surface of the bore.

BACKGROUND OF THE INVENTION

(1) Field of the invention

This invention relates generally to a method and apparatus for burnishing a bore, and more particularly, but not by way of limitation, to a method and apparatus for burnishing and work hardening a bore with a tool having a plurality of narrow rotatable rollers positioned around the periphery thereof.

(2) Description of the prior art

Many various types of roller burnishing tools of the expanding type are used for burnishing the inside surface of a bore in metal. Commonly these tools consist of plurality of wide rolls that are adjusted to the diameter of the bore being burnished by a center wedge cone which forces all of the rollers outwardly against the bore. These tools are progressively moved in and out of the bore to be burnished in order to gradually roll off ridges in the bore surfaces and work harden the bore. When used to burnish bores in hard steel, such as the alloy steel commonly used for hydraulic cylinders and the like, these prior burnishing tools are unable to exert enough force on the bore surface to roll down ridges left by the tool used to cut the bore in the steel. Consequently, the bore must be honed after it is initially cut in order to smooth down such ridges before the roller burnishing tool is used to smooth and polish the bore surface.

Another type of tool commonly used for burnishing the inside surface of a bore in metal includes a sphere formed of very hard metal. The sphere is of a diameter slightly larger than the bore to be burnished, and it is forced through the bore while being rotated. This type of tool requires heavy press apparatus of high tonage for forcing the sphere through the bore to be burnished, and often achieves unsatisfactory results in that the sphere will sometimes gall the surface of the bore being burnished through lack of adequate lubrication.

In using roller burnishing tools prior to the present invention, it has been common practice to cut the bore and hone it out on a commercial lathe and then remove the bore from the lathe for burnishing in separate apparatus. Removing the bore to be burnished from the lathe and setting it up in the burnishing apparatus is time consuming and expensive.

SUMMARY OF THE INVENTION

The present invention relates to a method and apparatus for burnishing the inside surface of a bore in metal. The apparatus comprises an elongated flexible body, at least one fixed rotatable roller attached to said body having a rotational axis parallel to the axis of said body, a movable roller attached to said body having a rotational axis parallel to the axis of said body, and means for moving said movable roller in directions perpendicular to the axis of said body so that said movable roller may be locked in a position against said bore thereby deflecting said body and causing said fixed roller to contact said bore.

It is, therefore, a general object of the present invention to provide a method and apparatus for burnishing a bore.

Another object of the present invention is the provision of a method and apparatus for burnishing a bore wherein the burnishing operation may be carried out immediately after the bore is cut thereby eliminating the need for honing the bore prior to burnishing.

A further object of the present invention is the provision of a method and apparatus for burnishing a bore wherein the burnishing apparatus may be used with a commercial lathe eliminating the need for special heavy press or other equipment for forcing the burnishing apparatus through the bore to be burnished.

It is still a further object of the present invention to provide a method and apparatus for burnishing a bore wherein the danger of galling the surface being burnished is reduced.

Yet a further object of the present invention is the provision of a method and apparatus for burnishing a bore wherein the bore may be burnished in one pass of the burnishing apparatus and the burnishing apparatus may then be removed without scratching the surface of the burnished bore.

Other objects and advantages of the invention will be evident from the following detailed description when read in conjunction with the accompanying drawings which illustrate the invention.

BRIEF DESCRIPTION OF THE DRAWINGS

FIG. 1 is a top view partially in cross-section of the apparatus of the present invention, FIG. 2 is a sectional view taken along line 2—2 of FIG. 1.

DESCRIPTION OF THE PREFERRED EMBODIMENT

Figure 3:
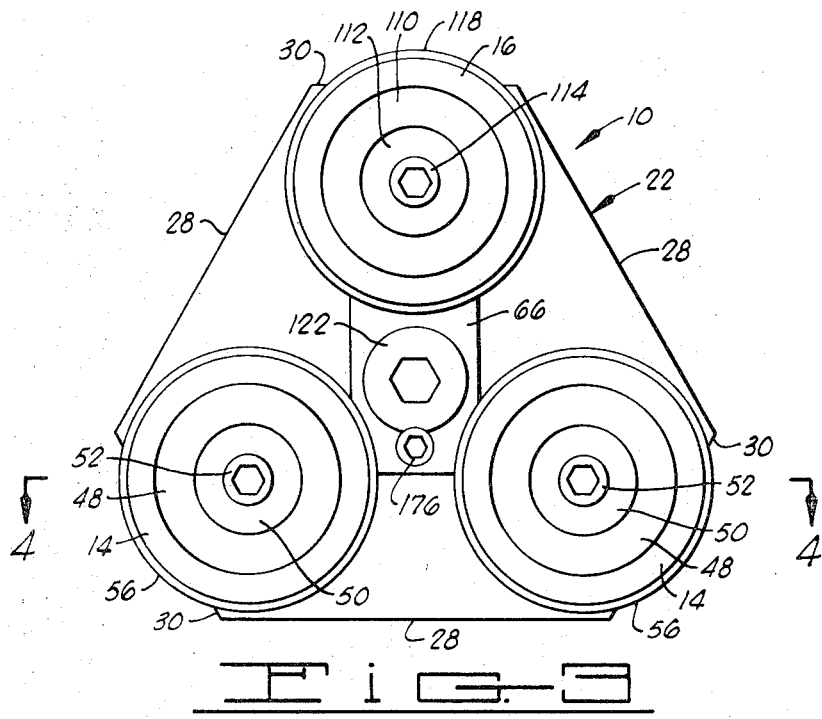
FIG. 3 is an enlarged end view of the apparatus of the present invention.

Referring now to FIG. 1, the apparatus of the present invention is illustrated generally designated by the numeral 10. Apparatus 10 basically comprises an elongated flexible body 12 having two fixed rotatable rollers 14 and a movable rotatable roller 16 attached to one end thereof. Body member 12 comprises a forward body member 22 which is threadedly attached to a flexible middle body member 24 which is in turn threadedly attached to a rearward body member 26. Rearward body member 26 is attached to a flanged member 20 which may be attached to the tail turret of a conventional lathe (not shown).

Figure 4:
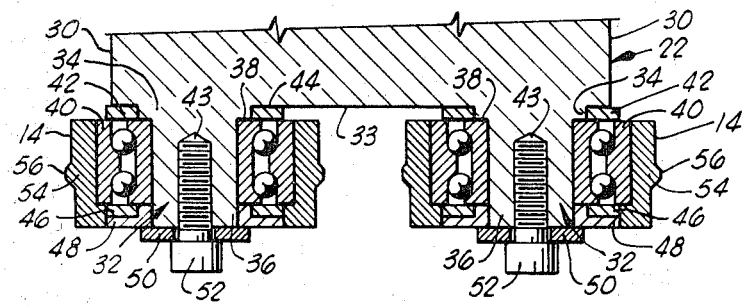
FIG. 4 is a sectional view taken along line 4—4 of FIG. 3.

Forward body member 22 is formed in cross-section in the shape of a hexagon (FIG. 3) having three sides of equal length 28, each having an opposite parallel side 30 of equal length. Referring now to FIGS. 3 and 4, the forward body member 22 includes two identical integral shafts 32 at the forward end 33 thereof having axes parallel to the axis of body 12; each positioned an equal distance from the axes of forward body member 22. Each of shafts 32 has a rearward portion 34 of larger diameter than a forward portion 36 thereby forming an annular shoulder 38. Conventional heavy duty bearings 40 are slidably secured over forward portions 36 of shafts 32 adjacent to shoulders 38. Conventional bearing gasket members 42 are slidably secured over rearward portions 34 of shaft 32 between bearings 40 and the surface 44 of forward body member 22. Rollers 14, formed of hard steel, are secured to bearings 40 in the customary manner and bearing gasket members 46 are positioned adjacent to bearings 40. Bearings 40, gaskets 42 and gaskets 46 are held in place by sleeves 48 which are positioned over forward portions 36 of shafts 32. Sleeves 48 are held in place by washers 50 which are in turn held in place by bolts 52 which are threadedly secured in threaded bores 43 positioned concentrically with the axes of shafts 32. It should be noted that shafts 32 are positioned so that portions of rollers 14 extend outwardly beyond two of sides 30 of forward body member 22. Rollers 14 are of identical size and shape and each includes a continuous raised portion 54 of trapezoidal shape in cross-section having an outer surface 56 parallel to the rotational axes of rollers 14 for contacting a bore to be burnished.

Referring now to FIGS. 1, through 3, forward body member 22 includes a threaded bore 58 in the rearward portion 60 thereof. An opening 62 of rectangular shape extends from bore 58 through forward body member 22 parallel to the axis of body member 22. A slot 64 extends upwardly through forward body member 22 from opening 62. Disposed within rectangular opening 62 is a wedge cam member 66 of substantially rectangular shape in cross-section having an upper surface 68, a lower surface 70, a forward end 72 and a rearward end 74. Upper surface 68 is sloped downwardly from rearward end 74 to forward end 72. That is, rearward end 74 has a greater height than forward end 72. Disposed within slot 64 is a wedge cam follower member 76 of substantially rectangular shape in cross-section having a top surface 80, a bottom surface 82, a forward end 84, a rearward end 86 and side surfaces 88 and 90. The bottom surface 82 of wedge cam follower member 76 is sloped downwardly from the rearward end 86 to the forward end 84. That is, rearward end 86 has a shorter height than forward end 84. The bottom surface 82 of cam follower member 76 rests directly on the top surface 68 of wedge cam member 66, and the slope of top surface 68 of wedge cam member 66 is the same as the slope of bottom surface 82 of wedge cam follower member 76. Wedge cam follower member 76 includes a pair of vertical slots 78 in sides 88 and 90. Forward body member 22 includes a pair of slots 92 identical to slots 78 in wedge cam follower member 76 positioned adjacent to slots 78. A pair of keys 94 are disposed within the slots 78 and 92 thereby preventing wedge cam follower member 76 from moving in directions parallel with the axes of body member 22, but allowing movement of wedge cam follower member 76 in directions perpendicular to the axis of body member 22. Thus, it will be understood that movement of wedge cam member 66 in directions parallel to the axis of body member 22 will cause movement of wedge cam follower 76 in directions perpendicular to the axis of body member 22.

Wedge cam follower member 76 includes an integral shaft 96 extending from forward end 84 in a direction parallel with the axis of body member 22. Shaft 96 is identical to shafts 36 described above and includes a rearward portion 98 and a forward portion 100. Rearward portion 98 has a larger diameter than forward portion 100 thereby forming shoulder 102. Disposed on shaft 96 is a conventional heavy duty bearing 104, the lower portion of which is adjacent to shoulder 102. A bearing gasket member 106 is disposed over rearward portion 98 of shaft 96 between forward end 84 of wedge cam follower member 76 and bearing 104. Roller 16 is secured to the outer surface of bearing member 104 in a conventional manner. A bearing gasket member 108 is positioned between bearing 104 and a sleeve 110. Sleeve 110 is secured on shaft 96 by a washer 112 which is in turn secured to shaft 96 by a bolt 114 which is threadedly secured in threaded bore 103 positioned concentrically with the axis of shaft 96.

Roller 16 is identical to rollers 14 previously described and includes a raised portion 116 having a trapezoidal cross-section and having a surface 118 parallel to the axis of shaft 96 for contact with a bore to be burnished.

Wedge cam member 66 includes a bore 120 extending therethrough positioned concentrically with the axis of body 12. Bore 120 includes a forward portion 121 of larger diameter than rearward portion 125 thereby forming annular shoulder 127. A bolt 122 having an enlarged head portion 123 and a threaded rearward portion 124 is disposed within bore 120 with head portion resting against shoulder 127 of bore 120. A threaded sleeve 126 is threadedly secured on the rearward end 124 of bolt 122. Sleeve 126 includes a threaded bore 128 therein and disposed within threaded bore 128 is a lock screw 130 for securing sleeve 126 at a desired position on bolt 122. Sleeve 126 is positioned adjacent to rearward end 74 of wedge cam member 66 and locked by tightening lock screw 130 so that bolt 122 may be freely turned but prevented from moving within bore 120 of wedge cam member 66 in directions parallel to the axis of bore 120.

As previously described an elongated flexible tubular middle body member 24 is threadedly secured in bore 58 of forward body member 22. The rearward end 132 of middle body member 24 is threadedly connected to rearward body member 26. Slidably disposed within middle body member 24 is an elongated cam follower member 134 of circular cross section having a forward portion 136 and a rearward portion 138. Forward portion 136 includes a threaded bore 140 positioned concentrically with the center line of cam follower member 134. The rearward portion 124 of bolt 122 is threadedly secured in threaded bore 140 of cam follower 136. Forward portion 136 of cam follower member 134 has a smaller diameter than rearward portion 138 of cam follower 134 thereby forming shoulder 142. A resilient spring member 144 is disposed around the outer periphery of forward portion 136 of cam follower 134 and sleeve 126. Spring member 144 rests against forward body member 22 at its forward end and shoulder 142 of cam follower 134 at its rearward end.

Rearward body member 26 which is threadedly attached to middle body member 24 as previously described, includes a pair of opposite transversely aligned openings 146 in the sides thereof. An eccentric cam member 152 is disposed within rearward body member 26 having an offset rotational bore 154. A bolt 148 extends through openings 146 in rearward body member 26 and through bore 154 in eccentric cam member 152 and is held in place by nut 150. Rearward body member 26 includes an elongated slot 156 in one side thereof extending in a plane perpendicular to the axis of bolt 148. A handle 158 is attached to eccentric cam member 152 and extends through slot 156 to outside rearward body member 26.

Cam follower member 134 is urged toward eccentric cam member 152 by spring member 144 so that the end 160 of rearward portion 138 of cam follower member 134 rests against the peripheral surface 162 of eccentric cam member 152. The end 160 of cam follower member 134 is flat for slidable contact with the peripheral surface 162 of eccentric cam member 152.

As will be understood, when handle 158 is moved forward from the position illustrated in FIG. 2, eccentric cam member 152 will be rotated and the distance from the rotational axis of cam member 152 to the outer peripheral surface 162 of cam member 152 adjacent to the end 160 of cam follower 134 will decrease with the rotation. Thus, as cam member 152 is rotated cam follower member 134 will be moved in a rearward direction by spring member 144. Cam member 152 may include a flat portion 153 on its peripheral surface at the point of greatest distance from the rotational axis of cam member 152. When the flat portion lies adjacent the end 160 of cam follower 134, the force imparted to cam follower member 134 by spring 144 will cause eccentric cam member 152 to resist rotation thereby preventing eccentric cam member 152 from rotating until handle 158 is forceably moved forward.

Top surface 80 of wedge cam follower member 76 includes a bevel 164 sloping toward the rearward end 86 of wedge cam follower 76. A locking member 166 having a beveled lower surface 168 is positioned adjacent to bevel 164 of wedge cam follower 76. Locking member 166 includes a slot 168 extending therethrough having an axis perpendicular to the axis of forward body member 22. Forward body member 22 includes a threaded bore 170 having an axis perpendicular to the axis of forward body member 22. A bolt 172 extends through slot 168 and is threadedly secured in bore 170. Slot 168 is wider when measured in a direction parallel to the axis of body member 122 than bolt 172 thereby allowing locking member 166 to slide in directions parallel to the axis of forward body member 22 when bolt 172 is loosened.

The forward end 72 of wedge cam member 66 includes a threaded bore 174 parallel with axes of bolt 122 positioned adjacent to head 123 of bolt 122. A locking bolt 176 is threadedly secured in threaded bore 174 for locking bolt 122 in a desired position.

OPERATION

Figure 5:
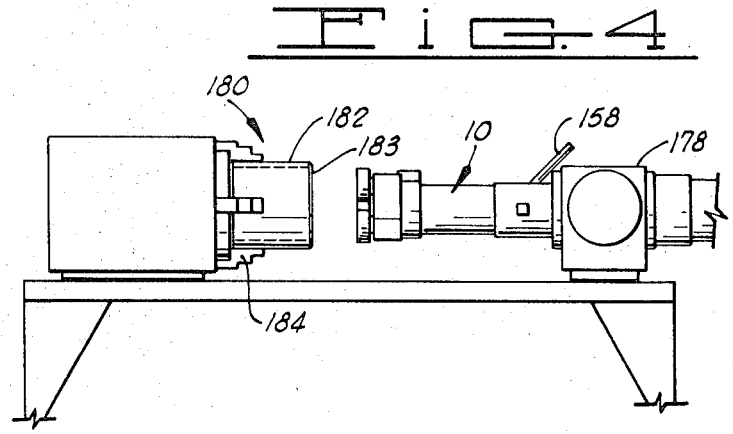
FIG. 5 is a view of the apparatus of the present invention mounted on a conventional lathe.

As mentioned above, the apparatus 10 may be attached to one of the mountings on a turret 178 of a conventional lathe 180 as illustrated in FIG. 5. A workpiece 182 is rigidly held by a conventional holding means 184 and rotated while a selected tool is progressively moved through the workpiece by forward movement of the turret 178. After a bore 183 has been cut into the workpiece 182 on the lathe, the apparatus 10 may be rotated into position and aligned with the bore 183. Handle 158 is then moved forward thereby rotating eccentric cam 152 (FIGS. 1 and 2) which in turn causes cam follower 134 to move in a rearward direction. The movement of cam follower 134 in turn moves bolt 122 and wedge cam 66 in a rearward direction. With the rearward movement of wedge cam 66 wedge cam follower member 76 and roller 16 are moved downwardly. Assuming that the movable roller 16 has been adjusted properly with respect to the bore 183 to be burnished, as will be described further hereinbelow, the apparatus 10 may be inserted into the bore 183 with the surfaces 56 of rollers 14 and the surface 118 of the roller 16 just inside the bore 183, but not contacting the bore 183. The handle 158 may then be moved rearwardly to the position illustrated in FIG. 2, thereby rotating eccentric cam member 152 and moving cam follower 134 in a forward direction. The movement of cam follower 134 will move bolt 122 and wedge cam member 66 forward which will in turn move wedge cam follower 76 and roller 16 upwardly in a direction perpendicular to the axis of body 12. The surface 118 of roller 16 will contact the surface of the bore 183 and will be moved an additional distance toward bore 183 deflecting body 12 in the opposite direction thereby causing the surfaces 56 of rollers 14 to contact bore 183. The workpiece 182 and bore 183 are then rotated by the lathe in the conventional manner at a rate of approximately 384 revolutions per minute. Simultaneously, apparatus 10 is progressively moved forwardly along the bore 183 at the rate of 0.012 inch per revolution with conventional lathe coolant being sprayed on the surface of the bore. The narrow surfaces 56 of rollers 14 and 118 of roller 16 will roll against the surface of bore 183 thereby causing ridges and other protuberances in the surface of the bore to be rolled down and smoothed. It has been discovered that best results are achieved when surfaces 56 of rollers 14 and surface 118 of roller 16 have a width measured in a direction parallel to the rotational axis of the rollers of 0.1 inch.

Once the rollers 14 and 16 have passed over the surface being burnished, the rotation of the workpiece 182 nd the forward movement of apparatus 10 may be stopped. Handle 158 may then be moved forward causing roller 16 to move downwardly as previously described and out of contact with the bore 183. The body 12 of apparatus 10 will return to an undeflected position and the rollers 14 will be removed from contact with the bore 183. The apparatus 10 may then be removed from the burnished bore 183 without scratching it.

In order to adjust the apparatus 10 to a proper contact diameter for a particular size bore to be burnished, bolt 172 is loosened and locked member 166 moved rearwardly. With handle 158 moved rearwardly to the position illustrated in FIG. 2, bolt 122 is rotated thereby moving wedge cam member 66 forward or backward and wedge cam follower member 76 and roller 16 upwardly or downwardly. Roller 16 is positioned so that surface 118 of roller 16 and surfaces 56 of rollers 14 will each contact a circle of the desired diameter. Locking screw 176 is then tightened locking bolt 122 in the desired position and locking member 166 is moved forward so that surface 168 of locking member 166 contacts surface 164 of wedge cam follower member 76. Bolt 172 is then tightened to clamp wedge cam follower member 76 against wedge cam member 66. The handle 58 may then be moved forward and the apparatus will be ready for use.

It has been discovered that by contacting the bore to be burnished with a tool having narrow roller surfaces at three points, a highly satisfactory finish will be obtained after one pass of the tool through the bore. The force required to be exerted on the surface of the bore to be burnished by the roller surfaces will vary with the hardness of the metal or other material the bore is formed in. As will be understood by those skilled in the art, this force may be changed by changing the slope of surfaces 68 and 82 of wedge cam member 66 and wedge cam follower member 76, and by changing the degree of eccentricity of eccentric cam member 152.

The present invention therefore is well adapted to carry out the objects and obtain the ends and advantages mentioned as well as those inherent therein. While presently preferred embodiments of the invention are given for the purpose of disclosure, numerous changes in the details of construction and the arrangement of parts can be made which will readily suggest themselves to those skilled in the art and which are encompassed within the spirit of the invention disclosed herein.

What is claimed is:

1. Apparatus for burnishing a bore comprising:
   an elongated flexible body;
   at least one fixed rotatable roller attached to said body having a rotational axis parallel to the axis of said body;
   a movable roller attached to said body having a rotational axis parallel to the axis of said body;
   means for moving said movable roller in directions perpendicular to the axis of said body so that said movable roller may be locked in a position against said bore thereby deflecting said body and causing said fixed roller to contact said bore.

2. The apparatus of claim 1 wherein each of said rollers includes a continuous raised portion around the entire outer periphery thereof, each of said raised portions having a surface parallel to the rotational axis of said rollers for contact with said bore.

3. The tool of claim 2 wherein said surfaces of said raised portions of said rollers are 0.1 inch wide measured in a direction parallel with the rotational axis of said rollers.

4. The tool of claim 1 which is further characterized to include two fixed rotatable rollers attached to said body, said fixed rotatable rollers being positioned an equal distance from the axis of said body.

5. The tool of claim 1 wherein said means for moving said movable roller in directions perpendicular to the axis of said body comprises:
   said body having an opening extending therethrough parallel to the axis of said body and having a slot in one end extending from said opening through said body in a direction perpendicular to the axis of said body;
   a wedge cam follower attached to said movable roller and slidably secured in said slot for movement in directions perpendicular to the axis of said body;
   a wedge cam slidably secured in said opening in said body positioned adjacent to said wedge cam follower so that movement of said wedge cam in directions parallel with the axis of said body causes said wedge cam follower to move in directions perpendicular to the axis of said body; and
   means for moving said wedge cam in directions parallel with the axis of said body a desired distance attached to said wedge cam.

6. A method of burnishing a bore comprising the steps of:
   inserting an elongated flexible tool within the bore to be burnished said tool having a plurality of rotatable rollers spaced around the periphery thereof, one of said rollers being movable in directions perpendicular to the axis of said tool;
   moving said movable roller outwardly from the axis of said tool a distance sufficient to cause said movable roller to contact said bore and to deflect said tool so that at least one other of said rollers contacts said bore;
   rotating said bore;
   moving said tool progressively along said bore thereby burnishing said bore;
   retracting said movable roller so that said tool is no longer deflected and said rollers no longer contact said bore; and
   removing said tool from said bore.

7. The method of claim 6 wherein said tool includes three rotatable rollers spaced around the periphery thereof.

8. The method of claim 7 wherein said rollers include narrow continuous surfaces around the periphery thereof for contacting said bore.

9. The method of claim 8 wherein said narrow continuous surfaces are 0.1 inch wide.

10. The method of claim 6 wherein said bore is rotated at the rate of 384 revolutions per minute.

11. The method of claim 10 wherein said tool is moved progressively along said bore at the rate of 0.012 inch per revolution.

References Cited
UNITED STATES PATENTS 1,429,403  9/1922  Callebert _____ 29—90

FRANCIS S. HUSAR, Primary Examiner

U.S. Cl. X.R.

72—117